(12) United States Patent
Yun et al.

(10) Patent No.: US 7,088,406 B2
(45) Date of Patent: Aug. 8, 2006

(54) LCD WITHIN MIRROR FUNCTION HAVING TOP REFLECTIVE POLARIZER

(75) Inventors: Young-Nam Yun, Seoul (KR); Hyung-don Na, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 10 days.

(21) Appl. No.: 10/676,989

(22) Filed: Sep. 30, 2003

(65) Prior Publication Data

US 2004/0201796 A1 Oct. 14, 2004

(30) Foreign Application Priority Data

Apr. 11, 2003 (KR) .................. 10-2003-0022999

(51) Int. Cl.
*G02F 1/1335* (2006.01)
(52) U.S. Cl. .................. 349/114; 349/113; 349/96; 349/97; 349/98
(58) Field of Classification Search ............ 349/96–98, 349/106, 111, 113–114, 67
See application file for complete search history.

(56) References Cited

U.S. PATENT DOCUMENTS

| | | | | |
|---|---|---|---|---|
| 5,699,188 A * | 12/1997 | Gilbert et al. | .............. | 359/584 |
| 5,882,774 A * | 3/1999 | Jonza et al. | ................. | 428/212 |
| 6,099,993 A * | 8/2000 | Kim et al. | ...................... | 430/7 |
| 6,144,426 A * | 11/2000 | Yamazaki et al. | ............ | 349/95 |
| 6,525,707 B1 * | 2/2003 | Kaneko et al. | ............... | 345/88 |
| 6,532,049 B1 * | 3/2003 | Li et al. | ........................ | 349/98 |
| 2002/0075433 A1 * | 6/2002 | Nishio et al. | ............... | 349/124 |
| 2004/0051827 A1 * | 3/2004 | Hinata et al. | ............... | 349/113 |

* cited by examiner

*Primary Examiner*—Andrew Schechter
*Assistant Examiner*—Phu Vu
(74) *Attorney, Agent, or Firm*—DLA Piper Rudnick Gray Cary US LLP

(57) ABSTRACT

The liquid crystal display device having a mirror function includes a back light assembly, a liquid crystal display panel, a first polarizing plate, a selective reflection polarizing plate and a second polarizing plate. The back light assembly generates a light. The liquid crystal display panel includes an upper substrate, a lower substrate facing the upper substrate, and a liquid crystal layer interposes between the upper substrate and the lower substrate. The liquid crystal display panel receives the light generated from the back light assembly to generate an image. The first polarizing plate is disposed on the upper substrate. The selective reflection polarizing plate is disposed on the first polarizing plate. The selective reflection polarizing plate selectively reflects an external light. The second polarizing plate is disposed on the lower substrate.

25 Claims, 3 Drawing Sheets

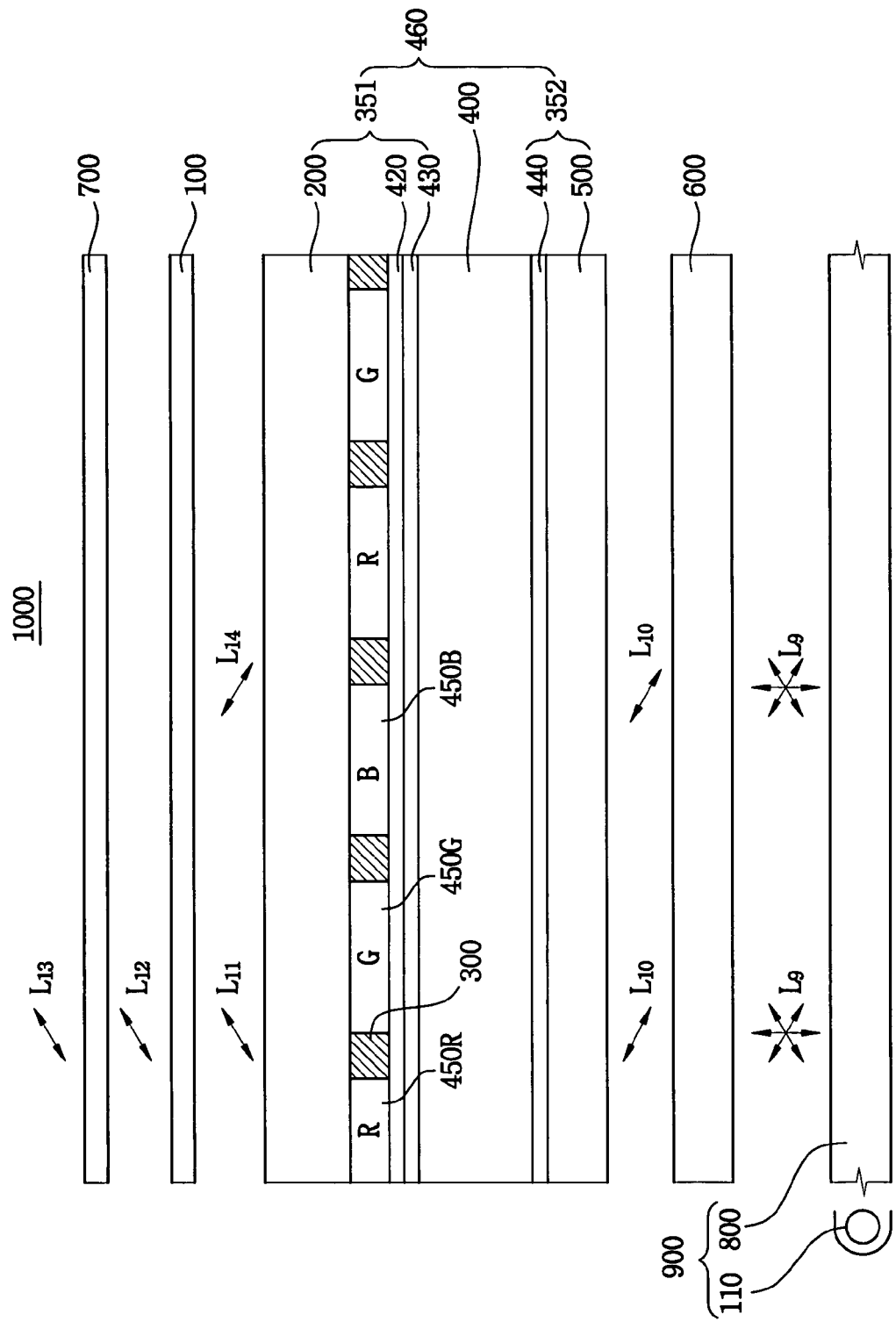

LCD WITHIN MIRROR FUNCTION HAVING TOP REFLECTIVE POLARIZER

CROSS-REFERENCE TO RELATED APPLICATIONS

This application relies for priority upon Korean Patent Application No.2003-22999 filed on Apr. 11, 2003, the contents of which are herein incorporated by reference in its entirety.

BACKGROUND OF THE INVENTION

1. Field of the Invention

The present invention relates to a liquid crystal display device and a method of manufacturing the liquid crystal display device, and more particularly to a liquid crystal display device having a function of a mirror and a method of manufacturing the liquid crystal display device.

2. Description of the Related Art

A mirror may be attached on personal information device having a liquid crystal display device, such as a mobile phone and a personal digital assistance (PDA).

The mirror may be attached on a flip of the mobile phone or on a backside of a battery of the mobile phone, so that a user does not need a separate mirror. However, the mirror may be broken. Therefore, the personal information devices having a mirror function are required.

The general liquid crystal display device uses a liquid crystal display panel as a mirror in a reflection mode, and as a display panel in a transmissive mode. However, in a reflection mode, an external light passes through a polarizing plate and enters the liquid crystal display panel to be reflected. Thus, a reflectivity is lowered. When the liquid crystal display panel or a back light assembly is used as a mirror, the reflectivity is lower than 10%, so that an image is not clear.

SUMMARY OF THE INVENTION

Accordingly, the present invention is provided to substantially obviate one or more problems due to limitations and disadvantages of the related art.

It is a feature of the present invention to provide a liquid crystal display device having a mirror function.

It is a second feature of the present invention to provide a method of manufacturing the liquid crystal display device.

The liquid crystal display device includes a back light assembly, a liquid crystal display panel, a first polarizing plate, a selective reflection polarizing plate and a second polarizing plate. The back light assembly generates a light. The liquid crystal display panel includes an upper substrate, a lower substrate facing the upper substrate, and a liquid crystal layer is interposed between the upper substrate and the lower substrate. The liquid crystal display panel receives the light generated from the back light assembly to display an image. The first polarizing plate is disposed on the upper substrate. The selective reflection polarizing plate is disposed on the first polarizing plate. The selective reflection polarizing plate selectively reflects an external light. The second polarizing plate is disposed on the lower substrate.

The method of manufacturing the liquid crystal display device is as follows. A liquid crystal display panel including an upper substrate, a lower substrate facing the upper substrate, and a liquid crystal layer is interposed between the upper substrate and the lower substrate is formed. A first polarizing plate is attached on the upper substrate. A second polarizing plate is attached on the lower substrate. A selective reflection polarizing plate is attached on the first polarizing plate. The selective reflection polarizing plate selectively reflects an external light.

The liquid crystal display device includes the selective reflection polarizing plate that is attached on the first polarizing plate. Thus, the liquid crystal display device has a mirror function.

BRIEF DESCRIPTION OF THE DRAWINGS

The above and other features and advantage points of the present invention will become more apparent by describing exemplary embodiments in detail thereof with reference to the accompanying drawings, in which:

FIG. 3 is an exploded schematic cross-sectional view of a liquid crystal display device of FIG. 1 showing a path of light, when the liquid crystal display device is used as a display device.

DESCRIPTION OF INVENTION

Hereinafter the preferred embodiment of the present invention will be described in detail with reference to the accompanied drawings.

Figure 1:
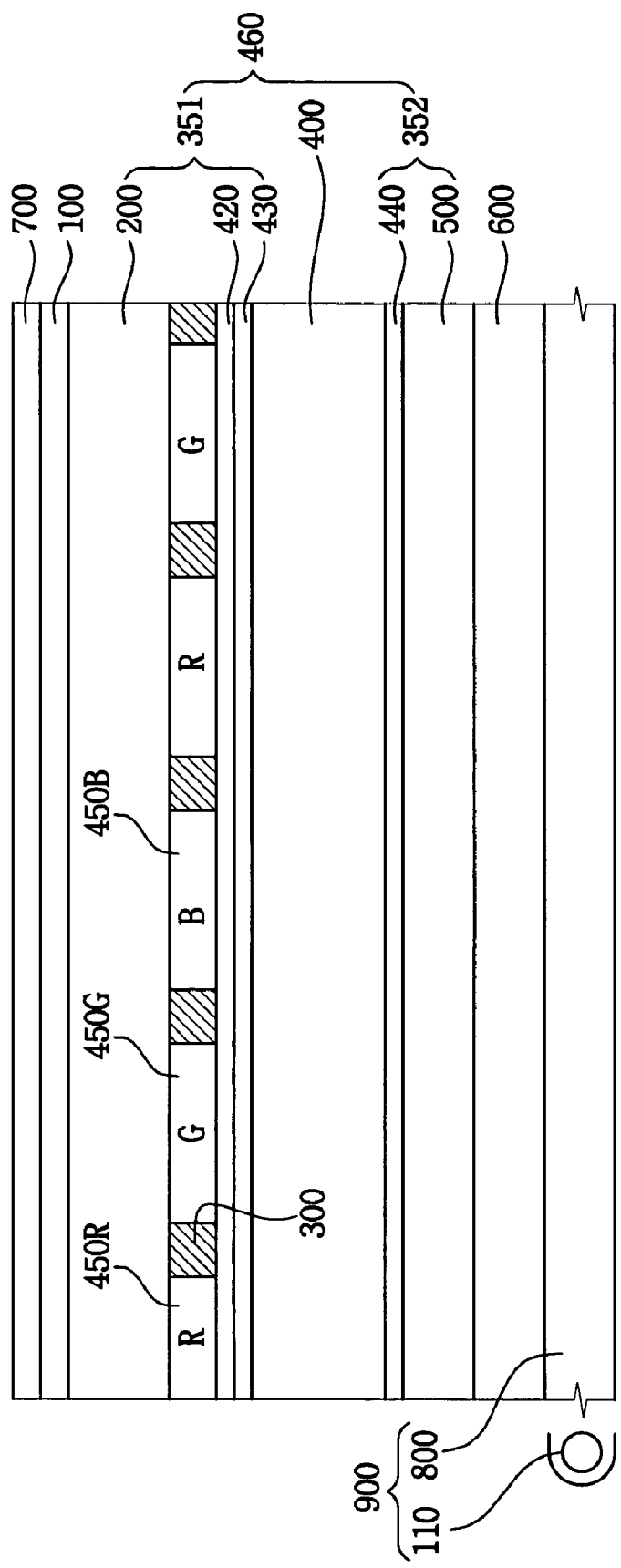
FIG. 1 is a schematic cross-sectional view showing a liquid crystal display device according to an exemplary embodiment of the present invention.

FIG. 1 is a schematic cross-sectional view showing a liquid crystal display device according to an exemplary embodiment of the present invention.

Referring to FIG. 1, a liquid crystal display device 1000 according to an exemplary embodiment of the present invention includes a liquid crystal display panel 460, a back light assembly 900, a selective reflection polarizing plate 700, a first polarizing plate 100 and a second polarizing plate 600.

The liquid crystal display panel 460 includes a color filter substrate (or upper substrate) 351, an array substrate (or lower substrate) 352 and a liquid crystal layer 400 interposed between the color filter substrate 351 and the array substrate 352.

The color filter substrate 351 includes a first transparent substrate 200, color filters 450R, 450G and 450B, a black matrix 300, a protection layer 420 and a common electrode 430. The color filters 450R, 450G and 450B are formed on the first transparent substrate 200. The black matrix 300 is formed also on the first transparent substrate 200. The black matrix 300 is interposed between the color filters 450R, 450G and 450B. The black matrix 300 masks a light leaked from a space disposed between the color filters. Thus, a general black matrix is formed in a two-layered structure of a chromium (Cr) layer and a chromium oxide (CrOx) layer or a three-layered structure of a chromium (Cr) layer, a chromium nitride (CrNx) layer and a chromium oxide (CrOx) layer. The general black matrix may comprise carbon black so as to prevent lowering a contrast ratio.

In the liquid crystal display device 1000 according to the embodiment of the present invention, the black matrix comprises a metal that has a high reflectance such as aluminum (Al), aluminum alloy, chromium (Cr), titanium (Ti) and tantalum (Ta), so as to enhance reflectance.

A photo-resist of a natural protein that may be dyed, such as gelatin or casein is coated on the color filter substrate. Then, the color filter substrate having a mask thereon is exposed and developed. A red-colored pigment or dyes is added to the natural protein, so that a red color filter 450R is formed. A green color filter 450G and a blue color filter 450B are formed through the same procedure.

A protection layer 420 is formed on the color filters 450R, 450G and 450B. The protection layer 420 may comprise a transparent material such as acryl resin.

A common electrode 430 is formed on the protection layer. The common electrode 430 may comprise an indium tin oxide (ITO) or an indium zinc oxide (IZO). The indium tin oxide (ITO) and an indium zinc oxide (IZO) are transparent and electrically conductive. The common electrode 430 forms a reference voltage.

The array substrate 352 includes a pixel electrode 440 and a second transparent electrode 500. The pixel electrode 440 is arranged in a matrix shape corresponding to the color filters 450R, 450G and 450B. An image voltage is applied to the pixel electrode to apply an electric field between the common electrode 430 and the pixel electrode 440. Thus, an arrangement of the liquid crystal molecules is changed to modulate a transmittance of a light generated from the back light assembly 900.

The back light assembly 900 is disposed under the array substrate 352. The back light assembly 900 provides the array substrate 352 with light. The back light assembly 900 includes a lamp 110 and a light guide plate 460. A first light generated from the lamp 110 is transformed into a second light that is two-dimensional via the light guide plate 800.

A direct-illumination type liquid crystal display device does not need the light guide plate 800. A plurality of the lamps 110 is disposed directly under the array substrate 352 in the direct-illumination type liquid crystal display device.

The first polarizing plate 100 is disposed on the first transparent substrate 200 of the color filter substrate 351. The second polarizing plate 600 is disposed on the second transparent substrate 500 of the array substrate 352.

The selective reflection polarizing plate 700 is disposed on the first polarizing plate 700. The selective reflection polarizing plate 700 reflects a portion of the external light, when the lamp 110 of the back light assembly 900 is turned off. The portion is above 50%. The first polarizing plate 100 absorbs a first portion of light and allows a second portion of light to pass through the first polarizing plate 100. A polarizing axis of the second portion of the light is substantially parallel with a polarizing axis of the first polarizing plate 100.

Thus, the selective reflection polarizing plate 700 may be operated as a mirror, and the first polarizing plate is operated as an analyzer so as to display an image generated from the color filter substrate 351.

The polarizing axis of the selective reflection polarizing plate 700 is substantially parallel with the first polarizing axis of the first polarizing plate 100. Thus, the light that passes through the selective reflection polarizing plate 700 may pass through the first polarizing plate 100 to be reflected on the black matrix 300. The polarizing axis of the light is not changed, so that the light that is reflected on the black matrix 300 may pass through both the first polarizing plate 100 and the selective reflection polarizing plate 700. Thus, the liquid crystal display device 1000 may be operated as a mirror.

When the liquid crystal display device 1000 displays an image, an image light analyzed by the first polarizing plate 100 may pass through the selective reflection polarizing plate 700. Thus, a user may recognize the image light.

A total reflectance R of the liquid crystal display device 1000 is expressed as the following expression 1.

$$R=r+r\times(1-A),\qquad\text{Expression 1}$$

wherein 'r' denotes a reflectance of the selective reflection polarizing plate 700, and 'A' denotes an aperture ratio.

For example, when the reflectance 'r' of the selective reflection polarizing plate 700 is 50%, and the aperture ratio 'A' is 0.5, the total reflectance 'R' of the liquid crystal display device 1000 is 75%. According to the expression 1, the total reflectance of the liquid crystal display device 1000 may be adjusted.

The second polarizing plate 600 is disposed under the array substrate 352. A light that exits from the back light assembly 900 is polarized to form a first light, while passing through the second polarizing plate 600. A polarizing axis of the first light is twisted by about 90° to form a second light, while the first light passing through the liquid crystal layer 400. The second light passes through both of the first polarizing plate 100 and the selective reflection polarizing plate 700, so that an image is formed.

The liquid crystal display device 1000 may be a normally black mode liquid crystal display device or a normally white mode liquid crystal display device.

In the normally black mode liquid crystal display device, light may not pass through the liquid crystal display panel of the liquid crystal display device, when no electric fields are applied to liquid crystal molecules. In the normally white mode liquid crystal display device, light may pass through the liquid crystal display panel of the liquid crystal display device, when no electric fields are applied to liquid crystal molecules.

In the normally black mode liquid crystal display device 1000, a second polarizing axis of the second polarizing plate 600 is substantially parallel to the first polarizing axis of the first polarizing plate 100, and in the normally white mode liquid crystal display device 1000, the second polarizing axis of the second polarizing plate 600 is substantially perpendicular to the first polarizing axis of the first polarizing plate 100.

The selective reflecting polarizing plate 700 may be a linear selective reflecting polarizing plate or a circular selective reflecting polarizing plate.

For example, a dual brightness enhancement film (DBEF) may be used as the linear selective reflecting polarizing plate. A cholesteric liquid crystal polirizer may be used as the circular selective reflecting polarizing plate.

Figure 2:
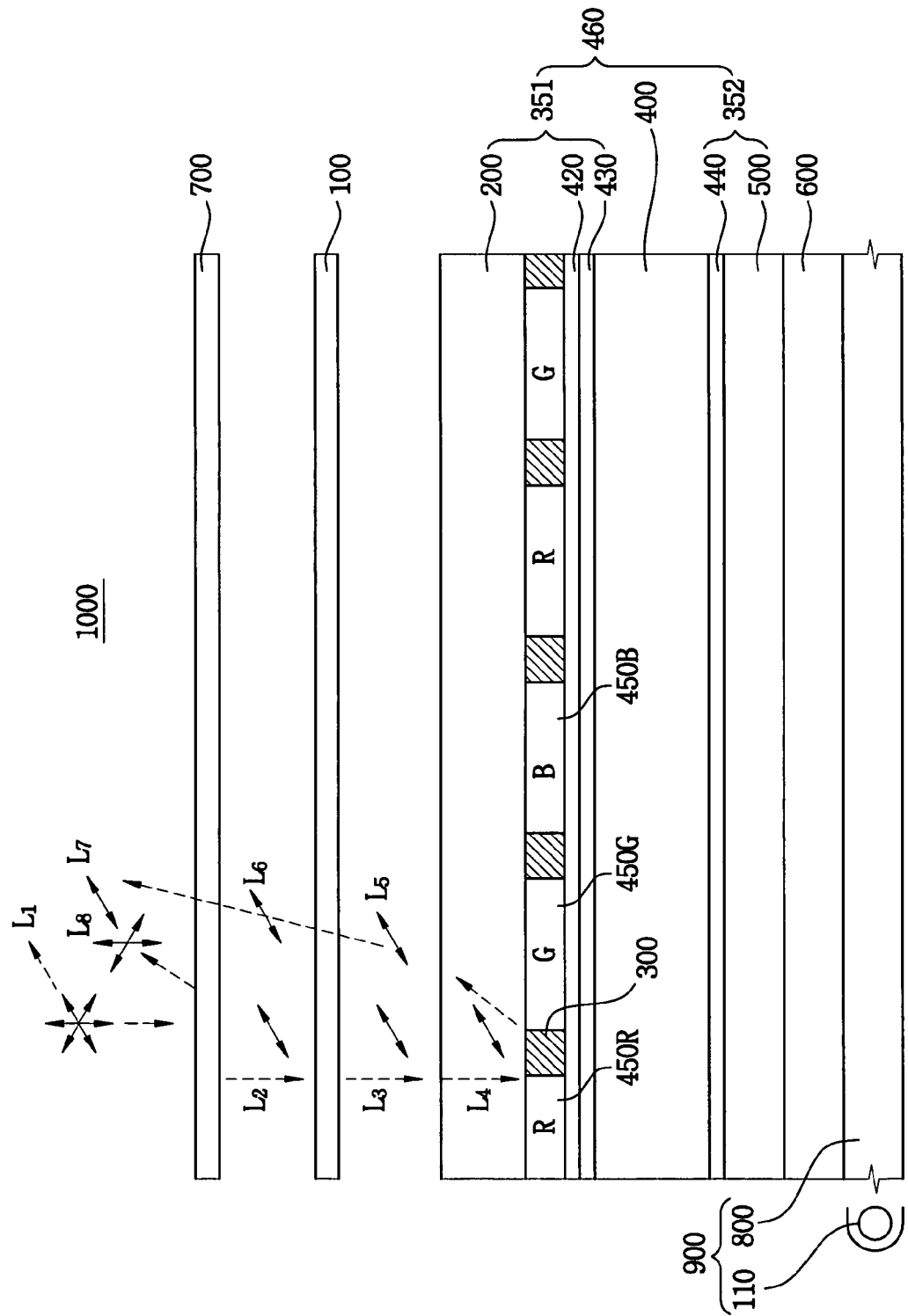
FIG. 2 is an exploded schematic cross-sectional view of a liquid crystal display device of FIG. 1 showing a path of light, when the liquid crystal display device is used as a mirror.

FIG. 2 is an exploded schematic cross-sectional view of a liquid crystal display device of FIG. 1 showing a path of light, when the liquid crystal display device is used as a mirror.

Referring to FIG. 2, when a lamp 110 of a liquid crystal display device 1000 is turned off, the liquid crystal display device 1000 may function as a mirror. A first portion of an external light L1 is reflected on a selective reflection polarizing plate 700, so that the liquid crystal display device 1000 functions as the mirror.

A light is an electromagnetic wave having a specific range of wavelength. When a direction of an oscillation of the electromagnetic wave is isotropic in a direction that is vertical to the advancing direction of the light, the electromagnetic wave is referred to as a natural light. When a direction of an oscillation of the electromagnetic wave is fixed, the electromagnetic wave is referred to as a polarized light.

The liquid crystal display device 1000 includes a selective reflection polarizing plate 700, a first polarizing plate 100 and a second polarizing plate 600.

A first portion of the external light L1 has a different direction of polarizing axis with that of the selective reflection polarizing plate 700. A second portion of the external light L1 has substantially the same direction of the polarizing axis as that of the selective reflection polarizing plate 700.

When the lamp 110 is turned off, the first portion of an external light L1 that is natural light is reflected on the selective reflection polarizing plate 700. The second portion of external light L1 passes through the selective reflection polarizing plate 700 to form a second light L2. The second light L2 passes though the first polarizing plate 100 to form a third light L3, because the selective reflection polarizing plate 700 and the first polarizing plate 100 have the same direction as the polarizing axis. The third light L3 passes through a first transparent substrate 200 to form a fourth light L4. The fourth light L4 is reflected on a black matrix 300 and exits from the first transparent substrate 200 to form a fifth light L5.

The black matrix 300 comprises a metal that has a high reflectance. Examples of the metal include aluminum (Al), aluminum alloy, chromium (Cr), titanium (Ti), tantalum (Ta), etc. Thus, the fourth light L4 may be reflected well.

The fifth light L5 passes through the first polarizing plate 100 to form a sixth light L6. The sixth light L6 passes through the selective reflection polarizing plate 700.

FIG. 3 is an exploded schematic cross-sectional view of a liquid crystal display device of FIG. 1 showing a path of light, when the liquid crystal display device is used as a display device.

Referring to FIG. 3, when a lamp 110 of a liquid crystal display device 1000 is turned on, the liquid crystal display device 1000 displays an image. A light guide plate 800 transforms a one-dimensional light generated from the lamp 110 into a two-dimensional light. The two-dimensional light exits from the light guide plate 800 to form a ninth light L9. The ninth light L9 is isotropic in a direction that is vertical to direction of advancing. The ninth light L9 passes through a second polarizing plate 600, and is polarized to form a tenth light L10. The tenth light L10 enters the liquid crystal display panel 460. The tenth light L10 includes light of which wavelength is various. Thus, the tenth light L10 has a white color.

When an image voltage is not applied to a pixel electrode 440, a polarizing axis of the tenth light L10 is rotated by about 90° and filtered to have a specific wavelength by color filters 450R, 450G and 450B, so that the tenth light is transformed into an eleventh light L11. Thus, the eleventh light L11 has a red color, a green color or a blue color, and the polarizing axis of the eleventh light L11 is substantially perpendicular to the polarizing axis of the tenth light L10.

The polarizing axis of the eleventh light L11 is parallel with the polarizing axis of the first polarizing plate 100, so that the eleventh light L11 passes through the first polarizing plate 100 to form a twelfth light L12. The twelfth light L12 passes through a selective reflection polarizing plate 700 to form a thirteenth light L13.

When the image voltage is applied to the pixel electrode 440, liquid crystal molecules are erected, so that the tenth light L10 passes through the liquid crystal display panel 460 without being rotated. Thus, a fourteenth light L14 of which polarizing axis is substantially parallel with that of the tenth light L10 exits from the liquid crystal display panel 460. The fourteenth light L14 has a specific color such as a red color, a green color or a blue color.

The fourteenth light L14 may not pass through the first polarizing plate 100 because the polarizing axis of the fourteenth light L14 is substantially perpendicular to that of the first polarizing plate 100.

Thus, a light that exits from each of pixels of the liquid crystal display panel 460 has various color and luminance, so that the liquid crystal display panel displays an image.

Hereinbefore, a normally white mode liquid crystal display device is explained for an example. However, the selective reflection polarizing plate may be attached on a normally black mode liquid crystal display device. In normally black mode liquid crystal display device, the selective reflection polarizing plate, the first polarizing plate, and the second polarizing plate have substantially parallel polarizing axis.

Having described the exemplary embodiments of the present invention and its advantages, it is noted that various changes, substitutions and alterations can be made herein without departing from the spirit and scope of the invention as defined by appended claims.

What is claimed is:

1. A liquid crystal display device consisting essentially of:
   a back light assembly that generates a first light;
   a liquid crystal display panel including an upper substrate, a lower substrate facing the upper substrate, and a liquid crystal layer interposed between the upper substrate and the lower substrate, the liquid crystal display panel receiving the first light generated from the back light assembly to display an image;
   a first polarizing plate disposed on the upper substrate;
   a selective reflection polarizing plate disposed on the first polarizing plate, the selective reflection polarizing plate reflecting a portion of an external light; and
   a second polarizing plate disposed on the lower substrate.

2. The liquid crystal display device of claim 1, wherein the second polarizing plate polarizes the first light generated from the back light assembly, and the first polarizing plate analyzes a second light that passes through the liquid crystal display panel.

3. The liquid crystal display device of claim 1, wherein the selective reflection polarizing plate reflects a portion of the external light, the portion being above 50%.

4. The liquid crystal display device of claim 1, wherein the upper substrate includes color filters arranged in a matrix shape, and black matrix disposed between the color filters.

5. The liquid crystal display device of claim 4, wherein the black matrix comprises one selected from the group consisting of aluminum (Al), aluminum alloy, chromium (Cr), titanium (Ti), tantalum (Ta) and a mixture thereof.

6. The liquid crystal display device of claim 1, wherein a first polarizing axis of the first polarizing plate is substantially parallel with a polarizing axis of the selective reflection polarizing plate.

7. The liquid crystal display device of claim 1, wherein a first polarizing axis of the first polarizing plate is substantially perpendicular to a second polarizing axis of the second polarizing plate.

8. The liquid crystal display device of claim 1, wherein a first polarizing axis of the first polarizing plate is substantially parallel with a second polarizing axis of the second polarizing plate.

9. The liquid crystal display device of claim 1, wherein the selective reflection polarizing plate corresponds to a linear selective reflection film.

10. The liquid crystal display device of claim 9, wherein the linear selective reflection polarizing plate is a dual brightness enhancement film.

11. The liquid crystal display device of claim 1, wherein the selective reflection polarizing plate corresponds to a circular selective reflection film.

12. The liquid crystal display device of claim 11, wherein the circular selective reflection film is a cholesteric liquid crystal polarizer.

13. A method of manufacturing a liquid crystal display device consisting essentially of:
    forming a liquid crystal display panel including an upper substrate, a lower substrate facing the upper substrate, and a liquid crystal layer interposes between the upper substrate and the lower substrate;
    attaching a first polarizing plate on the upper substrate;
    attaching a second polarizing plate on the lower substrate; and
    attaching a selective reflection polarizing plate on the first polarizing plate, the selective reflection polarizing plate reflecting a portion of an external light.

14. The method of claim 13, wherein the second polarizing plate polarizes a first light generated from the back light assembly, and the first polarizing plate analyzes a second light that passes through the liquid crystal display panel.

15. The method of claim 13, wherein the selective reflection polarizing plate reflects a portion of the external light, the portion being above 50%.

16. The method of claim 13, wherein the upper substrate includes color filters arranged in a matrix shape, and black matrix disposed between the color filters.

17. The method of claim 16, wherein the black matrix comprises one selected from the group consisting of aluminum (Al), aluminum alloy, chromium (Cr), titanium (Ti), tantalum (Ta) and a mixture thereof.

18. The method of claim 13, wherein a first polarizing axis of the first polarizing plate is substantially parallel with a polarizing plate of the selective reflection polarizing plate.

19. The method of claim 13, wherein a first polarizing axis of the first polarizing plate is substantially perpendicular to a second polarizing axis of the second polarizing plate.

20. The method of claim 13, wherein a first polarizing axis of the first polarizing plate is substantially parallel with a second polarizing axis of the second polarizing plate.

21. The method of claim 13, wherein the selective reflection polarizing plate corresponds to a linear selective reflection film.

22. The method of claim 21, wherein the linear selective reflection polarizing plate is a dual brightness enhancement film.

23. The method of claim 13, wherein the selective reflection polarizing plate corresponds to a circular selective reflection film.

24. The method of claim 23, wherein the circular selective reflection polarizing plate is a cholesteric liquid crystal polarizer.

25. A liquid crystal display device comprising:
    a back light assembly that generates a first light;
    no more than one liquid crystal display panel, the liquid crystal display panel including an upper substrate, a lower substrate facing the upper substrate, and a liquid crystal layer interposed between the upper substrate and the lower substrate, the liquid crystal display panel receiving the first light generated from the back light assembly to display an image;
    a first polarizing plate disposed on the upper substrate;
    a selective reflection polarizing plate disposed on the first polarizing plate, the selective reflection polarizing plate reflecting a portion of an external light; and
    a second polarizing plate disposed on the lower substrate.

* * * * *